S. W. FUNK.
TIRE PROTECTOR.
APPLICATION FILED NOV. 27, 1911.

1,050,636.

Patented Jan. 14, 1913.

Witnesses:

Inventor,
Samuel W. Funk.

UNITED STATES PATENT OFFICE.

SAMUEL W. FUNK, OF CHARTER OAK, CALIFORNIA.

TIRE-PROTECTOR.

1,050,636.   Specification of Letters Patent.   Patented Jan. 14, 1913.

Application filed November 27, 1911. Serial No. 662,762.

*To all whom it may concern:*

Be it known that I, SAMUEL W. FUNK, a citizen of the United States, residing at Charter Oak, in the county of Los Angeles and State of California, have invented a new and useful Tire-Protector, of which the following is a specification.

This invention relates to tire protectors for use on pneumatic or other resilient tires, and the main object of the invention is to provide a protector for this purpose in which the tread portion is divided transversely of the tire so as to provide for flexibility of the tread portion, transversely as well as circumferentially of the tire.

The invention relates particularly to tire protectors in which a series of chains are placed transversely about the tire and in this connection, one object of the invention is to provide for connecting said series of chains together.

Another object of the invention is to provide means for detachable connection of the several members of each transverse chain with one another and of each transverse chain to the adjoining transverse chains.

Other objects of the invention will appear hereinafter.

Figure 1:
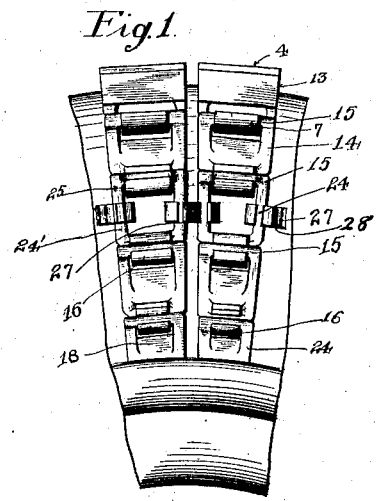
Figure 2:
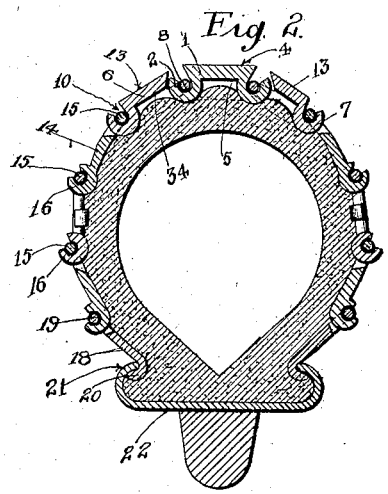
Figure 3:
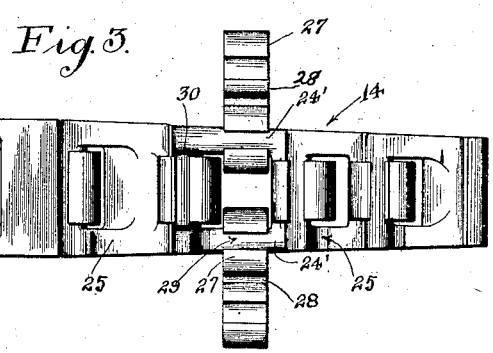
Figure 7:
Figure 4:
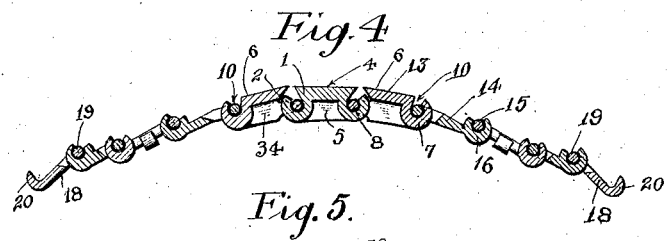
Figure 5:
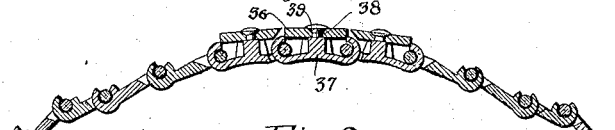
Figure 6:
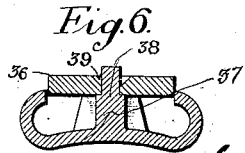

The accompanying drawings illustrate the invention, and referring thereto: Figure 1 is a side elevation of a portion of a tire with the protector in place thereon. Fig. 2 is a transverse section of the tire and protector. Fig. 3 is a plan view of part of one transverse chain or element of the protector. Fig. 4 is a transverse section of said chain. Fig. 5 is a transverse section of a different form of the chain. Fig. 6 is a vertical section of one of the chain members shown in Fig. 5, in process of manufacture. Fig. 7 is a side elevation of two adjoining chain members, showing the position in which they are placed in assembling or separating them.

Referring to Figs. 1 to 4, the protector is composed of a series of chains of identical construction, each of said chains being adapted to be wrapped over the tire and extend from the rim at one side over the tire to the rim at the other side, and to be fastened to the rim at each end. Each of said chains comprises a series of links or members connected in such manner as to permit free flexibility of the chain of members, and also in such manner as to permit of detachment of the several members of the chain when the same is removed from the tire, but to interlock firmly when the chain is in place on the tire. The members of each chain are preferably disposed symmetrically in regard to a central chain member, said central chain member consisting, for example, of a link 1 having a hook 2 at each end and provided with a raised or upwardly extending tread portion 4 between the hooks 2 and with a recess 5 in its under face between said hook portions and beneath said tread portion. At each side of said central member the chain is provided with one or more links or members 6, each of which is provided with a hook 7 at its outer end and with a bar 8 at its inner end for engagement with the hook of the preceding link or with the hook of the central member 1. The openings or notches 10 of the several hooks of the links are of such size that the bar 8 engaging therewith is interlocked with the hook and cannot be disengaged except by turning the links to a certain angular position, as hereinafter set forth. Each of the side links 6 is provided with an upwardly extending or raised tread portion 13, the several tread portions 4 and 13 forming the bearing surface for the protector. Beyond the several side links 6, the chain is provided with a series of side links 14 each of which is provided at its inner end with a bar 15 and at its outer end with a hook 16 for engaging with the bar of the next link, and a terminal link 18 is provided having a bar 19 at its inner end for engagement with the hook 16 of the last connecting link and having a hook 20 at its outer end for engaging under the flange 21 of the clencher rim 22 as shown in Fig. 2. The several side links 6 and the several attaching links 14 are formed so as to interlock securely when in position on the tire even if the tire is deflated, the side bars 24 of the several links embracing the hooks 7 or 16 so as to prevent lateral movement, but being cut away as at 25 so that when the links are turned to position as shown at Fig. 7 the bar of a link may be slid endwise from the hook of the next link.

Means are provided for connecting each chain to the adjoining chain at each side. For this purpose one of the side links 14 may be provided with rounded side bars 24' with which engage a hook portion 27 on a connecting link 28, said connecting link being provided with hook portions 27 at each end for engaging with the side bars 24' of adjoining chains to connect the chains.

together. The hook portions 27 are formed so as to embrace the side bars 24' on both sides, leaving an intervening slot 29 of sufficient dimensions to enable the said connecting link 28 to be slid endwise off of the said side bars when the corresponding link 14 is detached from the next inner link, the bar 15 at the inner end of the said link 14 being cut away as at 30 to provide for passage of the outer and inner hook portions of hooks 27.

Each of the side links 6 is provided with a recess 34 on its under face, the recesses 34 serving not only to lighten the several links but to provide for more secure engagement with the pneumatic tire by reason of the protrusion of the material of the tire into said recesses under the pneumatic pressure within the tire. The connecting links 14 are of different lengths and are detachable and interchangeable, so that by using different lengths of links, different sizes of tires can be fitted by dealers so that the chains will fit the tire accurately and tightly when said tire is inflated with air. The links 27 connecting the chains may also be of different lengths for the same reason.

The operation of the form of invention above described is as follows: The chains are placed over the tire side by side, each chain being connected to the next chain by the connecting links 28, it being understood that the connection must be made in a particular order, since when all the links are connected they mutually interlock and it is necessary to connect each link to a preceding link in such manner as to permit of connection to the next link, each link being connected by placing the links in position shown in Fig. 7 and sliding the bars endwise into the hooks. The complete system of chains formed in this manner is placed over the tire with the hooks 20 on the terminal links under the flange of the clencher rim, and when the tire is inflated it stretches the chains so that they become tight on the tire, the proportions being preferably such that the tire is forced into the recess of the links as above set forth.

As shown in Fig. 6 each of the links forming the tread portion of the chain may be provided with a detachable shoe or wearing plate 36 attached to the link 37 by a projection 38 on said link extending through a perforation 39 in said plate and riveted down or upset, the perforation 39 being countersunk to enable the plate to be held on until it is worn out. In this form of the invention the several links constituting the bearing portion need not be made detachable, as the parts subject to wear can be detached therefrom.

What I claim is:—

1. In combination with a wheel having a clencher rim and a pneumatic tire on said rim, a tire protector comprising a plurality of chains extending transversely over the tire, each chain comprising a plurality of tread links and a plurality of side links at each side of the tread links, the tread links being disconnected from the tread links of adjacent chains to allow of their free relative radial movement, the end links of the chains being provided with hooks adapted to engage the flanges of the clencher rim, and a link connecting one side link of each chain to the corresponding side link of the adjoining chain at each side thereof.

2. A tire protector comprising a plurality of chains extending transversely of the tire, a link connecting one link at each side of each chain to a corresponding link in an adjoining chain, the side links being provided with hooks and bars interengaging and interlocking when the links are in normal position on the tire and the said connecting links having hooks engaging side portions of the said links and interlocking with the side links when in normal position on the tire, said side links being cut away in their end portions and their side portions so as to permit the side links to be detached from one another and the connecting links to be detached from the side links when the said links are turned out of normal position.

In testimony whereof, I have hereunto set my hand at Los Angeles, California, this 18th day of November, 1911.

SAMUEL W. FUNK.

In presence of—
A. P. KNIGHT,
GLADYS RUSSELL.

---

Copies of this patent may be obtained for five cents each, by addressing the "Commissioner of Patents, Washington, D. C."